United States Patent
Leibach

(12)
(10) Patent No.: US 6,250,615 B1
(45) Date of Patent: Jun. 26, 2001

(54) VIBRATION ISOLATOR WITH A TENSION RESTRAINT

(75) Inventor: Markus Leibach, Goshen, IN (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 0 days.

(21) Appl. No.: 09/366,024

(22) Filed: Aug. 2, 1999

Related U.S. Application Data
(60) Provisional application No. 60/127,066, filed on Mar. 31, 1999.

(51) Int. Cl.$^7$ .................................................. F16F 13/00
(52) U.S. Cl. ........................................ 267/140.13; 267/219
(58) Field of Search .......................... 267/141.2, 141.3, 267/141.4, 141.5, 140.13, 140.14, 219; 248/562, 638, 636

(56) References Cited

U.S. PATENT DOCUMENTS

| | | | |
|---|---|---|---|
| 4,621,795 | * 11/1986 | Eberhard et al. | 267/140.1 |
| 4,657,219 | * 4/1987 | Kakimoto | 267/140.1 |
| 4,669,711 | * 6/1987 | Beer | 267/140.1 |
| 4,741,520 | * 5/1988 | Bellamy et al. | 267/140.1 |
| 5,009,402 | * 4/1991 | Sato | 267/140.1 |
| 5,060,919 | * 10/1991 | Takano et al. | 267/140.1 |
| 5,143,358 | * 9/1992 | Hibi et al. | 267/140.13 |
| 5,630,573 | * 5/1997 | Suzuki et al. | 267/140.13 |
| 5,971,376 | * 10/1999 | Mori et al. | 267/140.13 |
| 6,073,918 | * 6/2000 | Kojima et al. | 267/140.14 |

FOREIGN PATENT DOCUMENTS 0367328   6/1993   (EP) .

OTHER PUBLICATIONS

Continental Automotive Systems, Sound and Vibration Control Brochure, p. 10, Hydrolager (Hydromount).

* cited by examiner

*Primary Examiner*—Robert J Oberleitner
*Assistant Examiner*—Devon Kramer
(74) *Attorney, Agent, or Firm*—A. Michael Tucker; Casimir R. Kiczek

(57) ABSTRACT

A mount is provided with a pair of spaced apart support members. One of the support members includes a stop. A vibration isolation member is connected to both support members. The vibration isolation member has a rubber block for absorbing unwanted vibrations. A restraint member is connected to the rubber block to reduce the mass of the vibrating components so as to prevent reducing the resonant frequency of the device. The restraint member has a first portion and a second portion. The design is compact and does not permit the stop to extend above the restraint member in order to permit unrestrained travel of the first support member toward the second support member when the mount is in a compression mode. The second portion engages the stop to limit the stretch of the rubber block away from the support member and provides a heat shield for the rubber block and stop.

30 Claims, 1 Drawing Sheet

VIBRATION ISOLATOR WITH A TENSION RESTRAINT

CROSS REFERENCE TO RELATED APPLICATION

This application claims priority from Provisional Patent Application No. 60/127,066, filed Mar. 31, 1999.

FIELD OF THE INVENTION

This invention relates to a vibration isolating device for use in vehicle power train mounting systems and more particularly to a rubber vibration isolating apparatus which limits the axial travel of the device and provides a heat shield.

DESCRIPTION OF THE PRIOR ART

Many isolating devices permit unrestrained axial or longitudinal travel of the damping device, either in tension and/or in compression. Normally, axial or longitudinal travel in the compression mode does not seriously affect the life of the device. However, stretching or axial tension in the rubber device can cause elongation of the rubber and ultimately failure of the rubber component.

This is especially important in hydraulic isolation or damping devices which have a pair of supporting members which are secured to a vibrating body in a frame. A rubber block is disposed between supporting members and the concave surface of the rubber block and a rubber diaphragm which is joined to the rubber block, together define a liquid chamber filled with a damping fluid, such as glycol or a similar fluid. A partition defines the liquid chamber which is divided into a main liquid chamber and an auxiliary liquid chamber. The partition has an opening which is closed with an elastic rubber wall. The partition is also provided with a throttle passageway which communicates with both the main liquid chamber and the auxiliary liquid chamber.

High frequency, low amplitude vibration is imparted into the main liquid chamber which absorbs most of the vibration. Low frequency, high damping forces cause the liquid in the main chamber to move into the auxiliary liquid chamber and thereby absorb the large amplitudes and axial forces. In the process, particularly in the low vibration, high damping modes, the rubber block may be subjected to large axial or longitudinal travel which imposes high compression and alternatively high tension forces in the rubber block. These high tension forces in the rubber block can lead to its premature failure.

Several devices have been proposed to solve this problem, such as U.S. Pat. No. 4,842,258, U.S. Pat. No. 5,178,374, and U.S. Pat. No. 5,501,433. All of these devices seek to limit both the axial stretching mode and the axial compression mode in the rubber block. However, all of these devices are complicated and costly to make.

Thus, none of these devices provides a vibration device that limits axial stretching of the rubber mount, and at the same time provides a heat shield to protect the rubber block from temperature extremes and is simple, compact and inexpensive to make.

SUMMARY OF THE INVENTION

The present invention therefore sets out to solve the problems thus posed above by eliminating these drawbacks. To this end, a vibration damping device in accordance with the present invention is characterized by a pair of support members, one of the support members having a stop. A vibration isolation member is connected to the pair of support members. The vibration isolation member has a rubber block which defines an axis. The block stretches along the axis. A restraint member is connected to the rubber block. The restraint member has a first portion extending along the axis and a second portion attached to the front portion. The second portion engages the stop member to limit the axial travel of the rubber block away from the other of the pair of support assemblies. Additionally, the restraint member forms a heat shield to protect the rubber block.

It is an object of the present invention to provide a damping device with a resilient member where the stretch of elastic rubber block is limited, thus improving useful life for the damping device, is simple, easy to make and does not contribute to the critical core mass.

It is another object of the present invention to provide a damping device with an elastic rubber block which has an axial stretch restraint which also acts as a heat shield to prevent deterioration of the rubber due to temperature.

It is another object of the present invention to attach the stop to one of the support members so that the stop does not contribute to the critical core mass and thus does not deteriorate the resonance performance of the mount.

It is still another object of the present invention to provide a mount which locates the stop so as not to extend below the restraint member but yet permits unrestrained travel of the core toward the chassis side of the mount during its compressive mode and this provides a compact mount device.

It is a further object of the present invention to provide a tension restraint which is attached to one of the support members so as not to cause unwanted resonant effects in the working fluid chamber.

These and other features of the present invention will become apparent upon consideration of the following description and the appended claims with reference to the accompanying drawings all of which form part of the specification.

DETAILED DESCRIPTION OF THE PREFERRED EMBODIMENT

A mount is utilized to locate and support a vehicle powertrain assembly as well as isolate powertrain induced vibration from the chassis of the vehicle. A powertrain is defined as an energy conversion device or similar device which converts chemical energy into mechanical or electrical energy and includes a transmission which can be a mechanical, hydraulic or electrical device to provide motive power for a vehicle. Those skilled in the art will recognize that a chemical energy conversion device is preferably a heat engine, including gasoline fueled, diesel fueled, gas turbine, sterling engine or similar devices. The heat engine can also include battery powered, fuel cell powered or similar devices. Preferably, the energy conversion device is a gasoline fueled engine. The chassis can also transmit road induced vibration levels back to the powertrain assembly which can over time create harmful interactions in the powertrain assembly. The damping mount acts to provide a vibration isolation device to control harmful powertrain motion.

Figure 1:
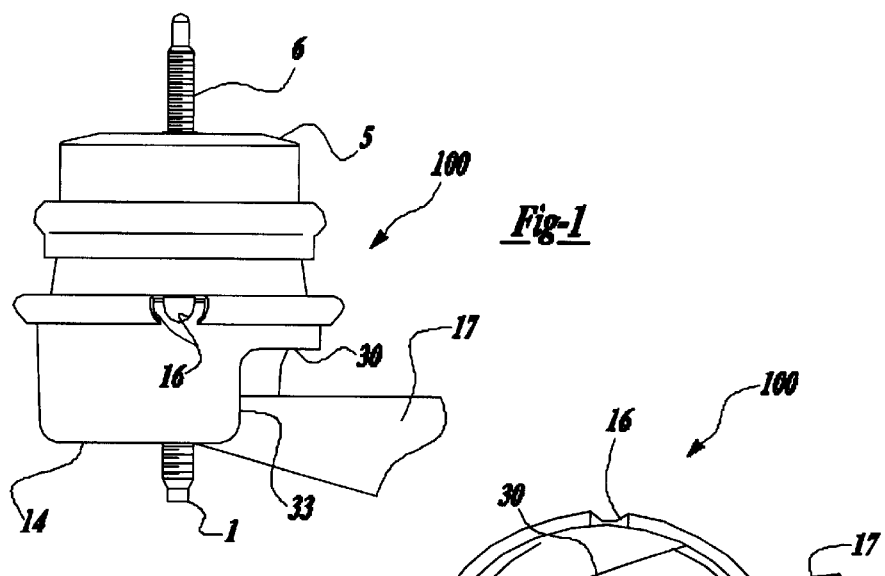
FIG. 1 is a side view of the damping device according to the present invention.
Figure 2:
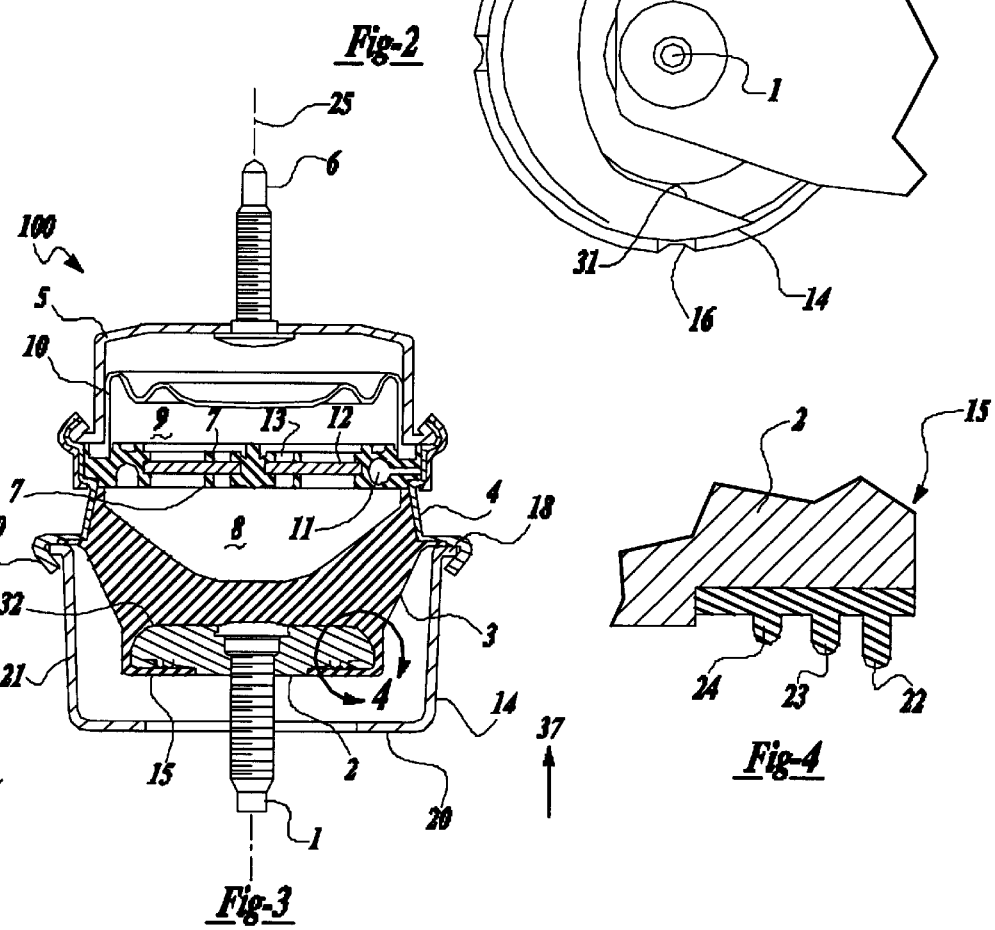
FIG. 2 is a top view of the damping device according to the present invention.
Figure 3:
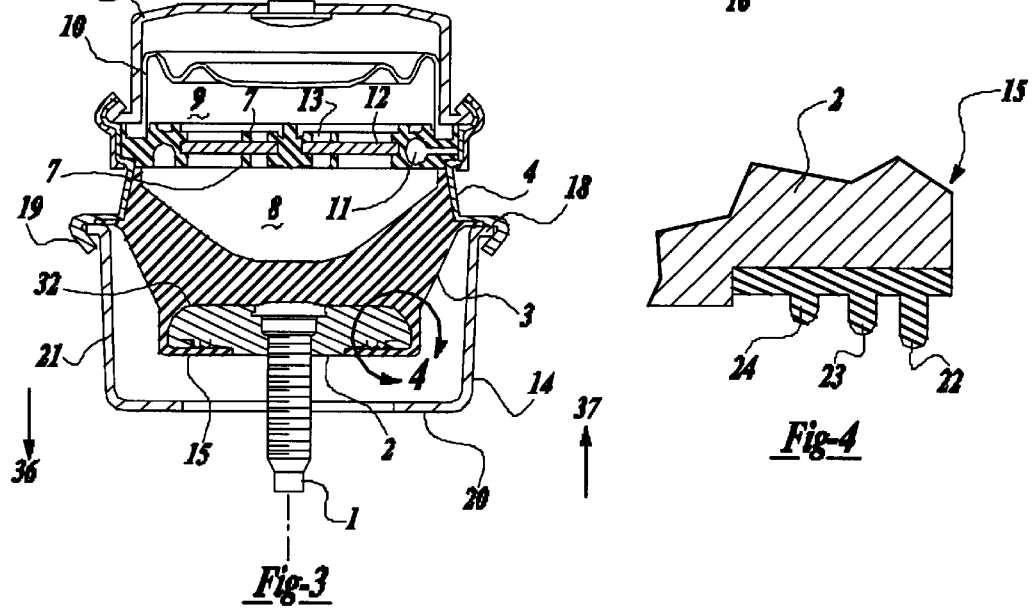
FIG. 3 is a cross sectional view of the preferred embodiment of the damp device in accordance with the present invention.

As shown in FIGS. 1–3, in order to connect the mount 100, according to the invention, to the powertrain assembly (not shown), a threaded bolt 1 is pressed, riveted or cast into an upper core 2 member of the mount 100. The upper core 2 is a preferably round member which is attached by the bolt 1 to the engine bracket 17. The core 2 may also be square, rectangular or any other similar, suitable shape. The opposite side of the core 2 is connected to a concave shaped rubber or elastomeric isolator 3 by rubber to metal bonding as is well known in the prior art. The isolator 3 or resilient member is also bonded at its periphery to a metal support ring 4. The support ring 4 is crimped to a cap 5. The cap 5 is attached to the chassis through a threaded bolt 6. The bolt 1 and bolt 6 define a longitudinal axis 25 for the mount 100. Bolt 1 connects the powertrain assembly (not shown) and bolt 6 connects the chassis (not shown). The mount 100, in response to vibrations from the chassis and/or powertrain assembly, moves along the longitudinal axis 25. The support ring 4 which is crimped to the cap 5 also rigidly holds two nozzle plates 7 together. The nozzle plates 7 form two separate fluid filled chambers 8, 9 respectively. On the engine side, or powertrain side, a working chamber 8 is formed and is bounded by the interior surface of the rubber isolator 3 and the nozzle plates 7. On the chassis side, a compensation chamber 9 is formed and bounded to the nozzle plates 7 and a flexible membrane or bellows 10. The nozzle plates 7 form a long and slender fluid filled channel 11 between the working chamber 8 and compensation chamber 9. The channel 11 is oriented tangentially around the bottom portion of the working chamber 8. The geometry and the relationship of the cross-section and length of the chamber 11 are important factors for the achievement of isolation and damping performance of the mount 100.

The nozzle plates 7 also have short nozzles 13 which are parallel to the longitudinal axis 25 of the engine mount 100 motion from the powertrain assembly. The short nozzles 13 are located adjacent to the periphery of the diaphragm 12. A diaphragm 12 separates the working chamber 8 and the compensation chamber 9. The soft compliance of an elastomeric diaphragm 12 allows the generally incompressible fluid in the working chamber 8 to isolate small movements and vibrations that are generated by the powertrain. This mechanism creates the primary isolation function for the powertrain generated vibration. The nozzle plates 7 also function to limit the soft compliant movement of the diaphragm 12 within certain limits. Furthermore, the nozzle plates 7 serve as a fluid restriction to force fluid through the channel 11 and create the desired vibration damping performance. In order to achieve high resonance frequencies in the powertrain bracket 17, it is desirable to reduce the weight of the mount components which are directly attached to the bracket. A stop or energy absorption member 15 is located on the core 2 and the tension restraint member 14 is attached to the support ring 4, preferably by crimping. Those skilled in the art will recognize that any other suitable connecting method known in the art is acceptable. The flange 18 of the member 14 is crimped to ring 4 by rolling over the end 19 over the flange 18. In this way, the components, such as the restraint member 14, flange 18 or ring 4 prevent deterioration of the resonance performance of the mount 100 by minimizing the mass being subjected to vibration.

Those skilled in the art will recognize that the mount damping performance can also be achieved with the engine mount oriented in the reverse condition at installation. However, installation with the lighter side of the mount attached to the powertrain bracket is preferable since it provides better vibration isolation characteristics by reducing the weight on the powertrain bracket which adds to the vibration mass. Any additional weight reduces the resonant frequency of the bracket, requiring stiffer brackets and engine block attachments and would be detrimental to the isolation characteristics of the mount. In many known designs, the core side of the mount is the lighter side. For this reason, aluminum and composite materials are preferably utilized to manufacture the core 2. In addition to the beneficial isolation or vibration attenuation performance results of such an installation, the endurance of the rubber components of the isolation device must also be taken into consideration. The rubber components such as the rubber isolator 3 and rubber member or stop 15, because of packaging considerations, are generally located near the engine block or powertrain assembly (not shown) and exhaust pipes (not shown). This exposes the elastomeric or rubber components to radiated and convective heat. Two primary factors which contribute to early deterioration of elastomeric properties are heat exposure and tension or stretch loads. In the present invention, the rubber isolator 3 and rubber member 15 are shielded from the radiated heat by a spaced apart but closely packaged tension restraint member 14 that interrupts the line of sight between the heat source such as the exhaust manifolds and the rubber isolator components. The tension restraint member 14 is generally a cylindrically shaped element that is located with the open side down around the powertrain mount or isolator 100 when viewed as shown in FIGS. 1 and 2. The member 14 also has a radially extending flange 20 which extends from the cylindrical portion 21 towards but spaced away from the threaded bolt 1, as shown in FIG. 3. The flange 20 cooperates with rubber member 15 to provide a limit in the tension direction 36 of the core 2 relative to the flange 20 of the member 14.

Access to attach the engine or powertrain bracket 17 to the isolator 100 is provided through the angular or cut-out section 30 that is cut away from the member 14 and is preferably oriented towards the powertrain assembly. The cut-out section 30 has a radial portion 31 and an axial portion 33. The attachment of the tension restraint member 14 to the support ring 4 allows tight packaging of the tension restraint member 14 to the powertrain bracket 17 thereby eliminating tolerance stack-ups between the various components which make up the mount 100. Thus, the radial axis and longitudinal axis travel limitations designed into the core 2 and tension restraint member 14 interface can be tightly matched by the clearance between the powertrain bracket 17 and tension restraint member 14, and good shielding from radiated heat sources is also provided. Additionally, the cut-out 30 and the flange 20 of the tension restraint member 14 permit the overall assembly height of the mount 100 to be compact since the bracket 17 can be attached to the bolt 1 through the cut-out section 30. Because of this compact design, the core 2 does not extend below the restraint member 14 in the tension direction 36 and yet permits unrestrained travel of the bracket 17 toward the threaded bolt 6 connected to the chassis in the compression direction 37 of the mount 100. The unrestrained travel of the bracket 17 and the core 2 in the compression direction 37 is defined as travel which is unrestrained by the geometry of the mount 100 and is only limited to the elastomeric properties of the isolator 3.

As stated earlier, the tension restraint member 14 provides a limitation to excessive tension or stretch loads in the rubber isolator 3 by providing a travel limit to the core 2 along the longitudinal axis 25 which is within the partial cavity formed by the restraint member 14 and rubber isolator 3. This provides a very compact design which is critical for tightly packaged powertrain installation in current motor vehicles. The core 2 may also be radially displaced relative to the tension restraint member 14 in the direction of movement for the typical tension loads introduced by the powertrain assembly. The core 2 has a rubber member 15 molded on the surface of the core 2 to provide low impact load absorption into the restraint member 14 and to avoid metal to metal contact of the bracket 17 to the core 2 due to angular movement of the powertrain assembly. As stated previously, the restraint member 14 is crimped or solidly attached to the support ring 4 and thus does not contribute to the critical core side mass. This prevents the restraint 14 and stop 15 from deteriorating the resonance performance of the engine bracket mount 17. This also alleviates the negative effects of internal tension restraints. Many currently known internal tension restraint systems include vibrating components near the fluid working chamber which often cause unwanted resonance effects significantly decreasing the isolation performance of known engine mounts.

The tension restraint member 14 and the support ring 4 have multiple openings 16 in the crimp section to allow for drainage of fluids and solid contaminants which may enter from the outside of isolator surface.

Figure 4:
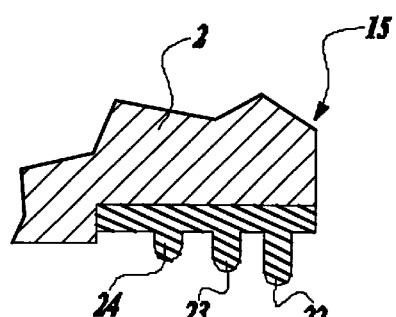
FIG. 4 is a partial cross sectional view of the elastomeric member of circle 4 in FIG. 3.

The rubber member or stop 15 and rubber isolator 3 may be made of Natural Rubber, Ethylene Propylene Diene, Hydrogenated Nitrile, Nitrile, Butyl, Ethylene Acrylate, Polyisoprene, Polybutadiene, Styrene Butadiene, or Fluorocarbon Polymers or other similar materials. Optionally, the stop 15 may be made of a different elastomer than the isolator 3. Butyl rubber is preferably used to make the stop 15 for high damping performance and Natural Rubber is preferably used to make the rubber isolator 3. The rubber member 15 may be optionally separately attached or fastened to the core 2 to permit tailoring of the engine mount spring rate. Preferably the rubber member 15 is between 1 to 10 mm thick. An elastomer member 15 on the core 2 which facilitates a gradual and even force distribution is preferable. The spring rate of the rubber member 15 can be modified by molding a plurality of beads of different height, ribs, cylindrical or conical risers, voids in the rubber surface, or other similar shapes used in the rubber industry. Preferably, the rubber member 15 has three concentric rings of rubber beads. The outer most rubber bead 22 projects away from the core 2 at the greatest height, the inner most rubber bead 24 projects away from the core 2 at the least height and the middle rubber bead 23 projects away from the core 2 at a height between the outer most bead and the inner most bead, as shown in FIG. 4. This permits a gradual load absorption as the restraint member 14 moves along the longitudinal axis 25 to contact the stop 15.

The tension restraint member 14 is designed for occasional impact due to excessive powertrain motion or chassis motion. The material thickness therefore ranges from 1 mm to 5 mm. Light metals with high strength to weight ratios are preferable such as aluminum and magnesium. Strength enhancing design features such as using ribs on the outside of the restraint member 14 can achieve similar effects. The preferable tension or stretch range limitation of the rubber isolator mount 100 is 5 o 20 mm from a loaded height of the mount that is when the mount is inserted between the bracket 17 and the chassis (not shown). Any metal to metal interference between the core 2 and bracket 17 must be limited to allow reliable function of the mount 100. However, some small plastic deformation is acceptable. Interference ranges from 300 mm$^2$ or larger were found to be acceptable.

Those skilled in art will also recognize that while the preferred embodiment has been described with a hydromount design, any rubber or elastomeric vibration absorbing mount or bushing as is well known in the art or similar isolation devices, can be employed with the described invention.

While it will be apparent that the preferred embodiment of the disclosed invention fulfills the objectives and benefits of the invention, it will be appreciated that the invention is susceptible to modification without departing from the proper scope of the appended claims.

What I claim is:

1. A vibration control device for use with a heat engine, comprising:
    a pair of spaced apart support members defining a longitudinal axis, one of said support members having a stop;
    a vibration isolation member connected to said pair of support members, said vibration isolation member having a rubber block, said vibration isolation member being a hydromount, said hydromount having a pair of fluid chambers and nozzles therebetween; and
    a restraint member connected to said rubber block, said restraint member having a first portion extending along said longitudinal axis and a second portion extending radially from said first portion, said second portion engaging said stop to limit the stretch of said rubber block away from the other of said pair of support members and permitting the compression of the one of said pair of support members toward the other of the said pair of support members, said restraint member further shielding said rubber block from the radiant heat of the heat engine said restraint member being connected to said rubber block so as to prevent contact of the restraint member into the fluid in said pair of chambers and any subsequent degradation of isolation performance.

2. A vibration control device for use with a heat engine, comprising:
    a pair of spaced apart support members defining a longitudinal axis, one of said support members having a stop, said stop having an elastomeric portion, said elastomeric portion having at least one concentric bead;
    a vibration isolation member connected to said pair of support members, said vibration isolation member having a rubber block; and
    a restraint member connected to said rubber block, said restraint member having a first portion extending along said longitudinal axis and a second portion extending radially from said first portion, said second portion engaging said stop to limit the stretch of said rubber block away from the other of said pair of support members and permitting the compression of the one of said pair of support members toward the other of the said pair of support members, said restraint member further shielding said rubber block from the radiant heat of the heat engine.

3. A vibration control device as claimed in claim 2 wherein said second portion moves along said longitudinal axis in response to heat engine vibration, said second portion contacting at least one concentric bead when said second portion moves longitudinally toward said stop.

4. A vibration control device as claimed in claim 2 wherein said at least one concentric bead having an outer diameter bead, an inner diameter bead and an intermediate diameter bead.

5. A vibration control device as claimed in claim 3 wherein the heat engine is mounted in a chassis, said rubber member being connected to the chassis so that said restraint member prevents reducing the resonant frequency of the vibration control device.

6. A vibration control device as claimed in claim 4 wherein said outer diameter bead having a first height, said inner diameter bead having a third height which is less than said first height, and said intermediate diameter bead having a second height between said first height and said third height.

7. An apparatus for controlling vibration from an energy conversion device, the energy device having a mounting bracket, said apparatus comprising:
- a first support member adjacent to the mounting bracket and having a stop;
- a second support member spaced apart from said first support member and forming a longitudinal axis;
- a vibration isolation member connected to said first support and said second support, said vibration member having a flexible block; and
- a tension restraint member connected to said block to prevent unwanted resonant effects, said restraint member having a first portion extending longitudinally from said block and a second portion extending radially from said first portion toward said first support member, said second portion of said tension restraint member contacting said first support member to limit the longitudinal stretch of said block, said second portion having a plurality of apertures, said restraint member further shielding said block from radiant heat from said energy conversion device.

8. An apparatus as claimed in claim 7 wherein said flexible block is an elastomer.

9. An apparatus as claimed in claim 8 wherein said elastomer is selected from a group of Natural Rubber, Ethylene Propylene Diene, Hydrogenated Nitrile, Nitrile, Butyl, Ethylene Acrylate, Polyisoprene, Polybutadiene, Styrene Butadiene, and Fluorocarbon.

10. An apparatus for controlling vibration from an energy conversion device, the energy device having a mounting bracket, said apparatus comprising:
- a first support member adjacent to the mounting bracket and having a stop, said stop further having at least one energy absorption member, said energy absorption member including at least one concentric ring;
- a second support member spaced apart from said first support member and forming a longitudinal axis;
- a vibration isolation member connected to said first support and said second support, said vibration member having a flexible block; and
- a tension restraint member connected to said block to prevent unwanted resonant effects, said restraint member having a first portion extending longitudinally from said block and a second portion extending radially from said first portion toward said first support member, said second portion of said tension restraint member contacting said first support member to limit the longitudinal stretch of said block, said restraint member further shielding said block from radiant heat from said energy conversion device.

11. An apparatus as claimed in claim 10 wherein said energy absorption member is an elastomer.

12. An apparatus as claimed in claim 11 wherein said elastomer is selected from a group of Natural Rubber, Ethylene Propylene Diene, Hydrogenated Nitrile, Nitrile, Butyl, Ethylene Acrylate, Polyisoprene, Polybutadiene, Styrene Butadiene, and Fluorocarbon.

13. An apparatus as claimed in claim 10 wherein said second portion has a cut-out section and prevents said first support from extending below said tension restraint member.

14. An apparatus for controlling vibration from a powertrain assembly, said apparatus comprising:
- a first support member having a top and a bottom, said bottom having a stop;
- a second support member spaced apart from said first support member and forming a longitudinal axis;
- a vibration isolation member connected to said first support and said second support, said vibration member having a flexible block; and
- an annular tension restraint member connected to said block to prevent unwanted resonant effects, said restraint member having a first portion extending longitudinally from said block, a second portion extending radially from said first portion an upper portion, said second portion contacting said first support member to limit the longitudinal stretch of said block, said first portion of said tension restraint member having a cut-out section and said second portion of said tension restraint member having a cut-out section, said cut-out sections permitting the powertrain assembly to be attached to said first support member in a compact manner, whereby said first support member is contained within said annular restraint member and permits longitudinal compression travel of said first support member toward said second support member.

15. An apparatus as claimed in claim 14 wherein said flexible block is an elastomer.

16. An apparatus as claimed in claim 14 wherein said vibration isolator is a hydromount.

17. An apparatus as claimed in claim 14 wherein said vibration isolator is an elastomer vibration absorbing mount.

18. An apparatus as claimed in claim 14 wherein said restraint member further shields said block from radiant heat of the powertrain assembly.

19. An apparatus as claimed in claim 14 wherein said stop includes an elastomeric portion.

20. An apparatus as claimed in claim 19 wherein said elastomeric portion includes at least one concentric bead.

21. An apparatus as claimed in claim 20 wherein said second portion contacts said stop to limit the longitudinal stretch of said flexible block.

22. A vibration control device for use with a heat engine having a mounting bracket, said device comprising:
- a pair of spaced apart support members defining a longitudinal axis, one of said pair of support members having a mounting surfaces to attach the mounting bracket thereon, one of said surfaces on said pair of support members having a central connecting portion adjacent to the mounting bracket and an outer portion having a resilient stop, the mounting bracket being attached to said central connecting portion and covering a portion of said resilient stop;
- a vibration isolation member connected to each of said support members, said vibration member having a flexible block portion; and
- a tension restraint member connected to the periphery of said flexible block portion to prevent unwanted resonant effects, said restraint member having a first portion extending longitudinally from said block and a second portion extending radially from said first portion toward one of said support members, said second portion contacting said resilient stop on one of said support members to limit the longitudinal stretch of said vibration isolation member.

23. A device as claimed in claim 22, wherein said resilient member further shields said flexible block portion from radiant energy from said heat engine.

24. A device as claimed in claim 22, wherein said vibration isolation member is a hydromount.

25. A device as claimed in claim 22, wherein said resilient stop is separately attached to said outer portion so as to tailor the engine mount spring rate.

26. A device as claimed in claim 22, wherein said resilient stop includes a variable spring rate which is tailored by employing different geometric shapes.

27. A device as claimed in claim 22, wherein the longitudinal tension mode travel of said tension restraint member is between 5 to 20 mm from the loaded height of said device.

28. A device as claimed in claim 22, wherein said second portion contacts more than a 90 degree sector of said resilient stop.

29. A device as claimed in claim 22, wherein said second portion contacts more than a 90 degree sector to nearly a 180 degree sector of said resilient stop.

30. A device as claimed in claim 22, wherein said resilient stop is integrally molded with said flexible block portion.

* * * * *